(12) United States Patent
Chauvin et al.

(10) Patent No.: US 8,689,532 B2
(45) Date of Patent: Apr. 8, 2014

(54) DEVICE FOR PACKAGING A LIQUID FOOD PRODUCT

(75) Inventors: Guillaume Chauvin, Monthureux sur Saone (FR); Fabio Chimetto, Piazzola Sul Brenta (IT); Klaus Hartwig, Nancy (FR)

(73) Assignee: Nestec S.A., Vevey (CH)

( * ) Notice: Subject to any disclaimer, the term of this patent is extended or adjusted under 35 U.S.C. 154(b) by 501 days.

(21) Appl. No.: 13/002,200

(22) PCT Filed: Jul. 2, 2009

(86) PCT No.: PCT/EP2009/058305
§ 371 (c)(1),
(2), (4) Date: Feb. 9, 2011

(87) PCT Pub. No.: WO2010/003871
PCT Pub. Date: Jan. 14, 2010

(65) Prior Publication Data
US 2011/0265433 A1 Nov. 3, 2011

(30) Foreign Application Priority Data
Jul. 7, 2008 (EP) .................................... 08159853

(51) Int. Cl.
*B65B 3/02* (2006.01)
*B29C 49/46* (2006.01)

(52) U.S. Cl.
USPC ............................... 53/561; 53/319; 425/524

(58) Field of Classification Search
CPC ................. B65B 3/022; B29C 49/46
USPC ............ 53/423, 489, 127, 561, 140, 289, 319, 53/329, 330, 452; 264/524, 525; 425/525, 425/524
IPC ........................................................ B65B 3/02
See application file for complete search history.

(56) References Cited

U.S. PATENT DOCUMENTS 3,162,706 A * 12/1964 Cheney .......................... 264/525
3,251,915 A * 5/1966 Pechthold ....................... 264/524
(Continued)

FOREIGN PATENT DOCUMENTS

EP 1362685 A2 * 11/2003 ................ B65B 3/02
EP 1529620 5/2005
(Continued)

OTHER PUBLICATIONS

EPO machine translation of FR 1430316 A, retrieved from http://worldwide.espacenet.com/singleLineSearch?locale=en_EP, May 8, 2013, 5 pages.*

(Continued)

*Primary Examiner* — Stephen F Gerrity
(74) *Attorney, Agent, or Firm* — K&L Gates LLP

(57) ABSTRACT

The invention relates to a device for delivering a beverage into a thermoplastic container formed from a heated preform, the preform being approximately cylindrical and positioned in a mold, characterized in that it includes injection unit for injecting at least one beverage into a recess in the preform so as to promote expansion of the preform inside the mold, the mold defining the shape of the container, the injection unit comprising an injection head designed to inject at least one beverage through a mouth of the recess, the injection head being integrated into the mold.

2 Claims, 3 Drawing Sheets

(56) References Cited

U.S. PATENT DOCUMENTS

| | | | |
|---|---|---|---|
| 3,358,062 A * | 12/1967 | Lemelson | 264/524 |
| 3,919,374 A * | 11/1975 | Komendowski | 264/525 |
| 4,054,017 A | 10/1977 | Naumann | |
| 4,707,966 A * | 11/1987 | Weiler et al. | 264/525 |
| 4,757,907 A * | 7/1988 | Hansen | 53/140 |
| 5,351,462 A | 10/1994 | Anderson et al. | |
| 7,473,388 B2 | 1/2009 | Desanaux et al. | |
| 2005/0206045 A1* | 9/2005 | Desanaux et al. | 425/526 |
| 2008/0029928 A1* | 2/2008 | Andison et al. | 264/238 |

FOREIGN PATENT DOCUMENTS

| | | | | |
|---|---|---|---|---|
| FR | 1430316 | | 3/1966 | |
| FR | 2839277 | | 11/2003 | |
| JP | 57123027 | | 7/1982 | |
| JP | 05077804 A | * | 3/1993 | ............... B65B 9/10 |
| JP | 2000043129 | | 2/2000 | |
| JP | 2005088909 A | * | 4/2005 | ............... B65B 3/02 |
| WO | 2006096916 | | 9/2006 | |

OTHER PUBLICATIONS

JPO machine translation of JP 2000-43129 A, retrieved from http://www.ipdl.inpit.go.jp/homepg_e.ipdl, May 8, 2013, 5 pages.*

PCT International Search Report for International Application No. PCT/EP2009/058305 with a date of mailing of Oct. 2, 2009, 5 pages.

* cited by examiner

DEVICE FOR PACKAGING A LIQUID FOOD PRODUCT

FIELD OF THE INVENTION

The present invention relates to the field of manufacturing containers made of a polymer material, especially a polyester. More particularly, it relates to the field of manufacturing polyester bottles, preferably polyethylene terephthalate (PET) bottles containing a liquid, for example mineral water or else a flavoured drink, a soda, a fruit juice or a liquid yoghurt.

BACKGROUND OF THE INVENTION

For many years, the PET bottles usually found on the market have been manufactured by the blow moulding or stretch-blow moulding of PET preforms using compressed air.

A preform usually takes the form of a cylindrical tube closed at one of its ends and open at its opposite end. The open head of the preform corresponds to the neck of the container.

During the conventional process for manufacturing containers from preforms, the preforms are slipped onto the cylindrical mounts of a continuous conveyor belt, which thus transports the preforms through an oven, essentially formed by a straight section bordered on each side by radiative heating means, so as to temperature-condition the plastic for the subsequent stretch-blow moulding step.

The hot preform is then taken off and transported into a mould of a blow moulding machine. The transport movement is coordinated with that of the blow moulding machine.

This is generally produced in the form of a carousel, for example, a rotary carousel that rotates continuously about its vertical axis and carries, on its periphery, a series of identical moulds.

The preform is placed in the mould immediately after it has been opened and the previously formed container has been removed.

The preform is heated beforehand so as to be in the mould at a temperature above the glass transition temperature (about 100° C.) so as to enable it to be formed by stretch-blow moulding.

The temperature of the preform at the end of the heating step is slightly above that required inside the mould of the blow moulding machine, so as to take into account the cooling that takes place over the distance that exists between the heating site and the blow-moulding site.

Thanks to the simultaneous presence of several moulds, such a blow moulding machine can produce containers at very high rates, of around 1000 to 2000 bottles per hour per mould, i.e. around several tens of thousands of units per hour per installation.

The stretch-blow moulding takes place by stretching using a metal rod and by injecting air at pressures ranging from 3 to 40 bar ($3 \times 10^5$ Pa to $4 \times 10^6$ Pa). The air is injected through a nozzle, the end of which is introduced through the opening in the head of the preform.

It is only after the bottle has been formed that filling means are employed, these generating, before and after filling, mechanical movements in particular causing splashing of the beverage.

It will be understood that the devices thus used require quite a number of human interventions at the maintenance stage, and also in operation when the operational parameters require to be readjusted.

In particular, the high pressures used for the beverage have the effect that the known devices must be regularly interrupted.

Moreover, after filling, the containers must be sealed, by a cap or a screw or clip-fastening cap, which process cannot be extensively automated as it involves means external to the stretch-blow moulding machine.

Within this context, the object of the present invention is to provide a compact device for delivering, in series, volumes of a beverage, in a finalized manner and in a limited number of steps, the device requiring little maintenance in operation.

SUMMARY OF THE INVENTION

The Applicant has therefore developed a device for delivering a beverage into a thermoplastic container formed from a heated preform, the preform being approximately cylindrical or other and positioned in a mould, the device including injection means for injecting at least one beverage into a recess in the preform so as to promote expansion of the preform inside the mould, the mould defining the shape of the container, said injection means comprising an injection head designed to inject at least the beverage into a recess in the preform so as to promote an expansion of the preform inside the mould, the mould defining the shape of the container, said injection means including an injection head designed to inject at least the beverage through a mouth of the recess, said injection head being integrated into the mould.

The fact that the injection head is incorporated into the mould integrated/avoids the splashing of the beverage associated with the injection head in the devices of the prior art which use an external injection head, in particular when said head undergoes a longitudinal movement during the use of the delivery device.

According to an essential feature of the invention, since said neck of the recess defines a neck of the container, the device further includes a means for fixing a stopper on said neck.

Thus, since the liquid used for manufacturing the containers is the beverage to be delivered thereinto, the device according to the invention makes it possible to dispense with a subsequent step of filling and sealing the container.

The manufacture, filling and sealing steps are thus integrated into one and the same step carried out by an integrated device.

This solution has substantial economic advantages and also limits the risks of contamination, particularly bacterial contamination, of the empty or unsealed container.

According to one advantageous feature, the injection head is placed so as to allow the stopper fixing means to operate. In particular, it is integrated into the filling station.

According to one embodiment, the device further includes a means for pressurizing a volume of beverage to be injected.

In particular, provision is made for said pressurizing means to comprise a pump.

The device may also comprise a piston, optionally employed in combination therewith.

According to another embodiment, not exclusive to the previous one, a central pressurized air reservoir is used.

According to one very particularly advantageous characteristic, the device further includes a system for degassing the beverage.

This means is preferably placed upstream of the delivery device in a beverage feed circuit.

Provision is also made, in one embodiment, for the device to further include means for cleaning at least one part of the mould.

These means make it possible optionally to eliminate thermoplastic debris or volumes of beverage spilt in the mould.

It should be noted that, in a manner which is known per se but is advantageous within the context of the invention, the mould may consist of a mould base and two upper mould parts.

Finally, the device is preferably characterized in that it further includes means for forming the container using air, up to a fraction of its final volume, and means for increasing the internal pressure in the container, its formation being accomplished using the beverage.

It should also be noted that the device comprises two injection heads, each of the injection heads being integrated into the mould.

It is advantageous for at least one injection head to include a spout on the end of a duct perpendicular to one axis of a cavity of the mould, said duct being connected to a circuit for supplying at least one constituent of said beverage.

According to one embodiment, said duct is integrated into a top part of said mould.

Preferably, the top part is composed of two sub-parts and the duct is formed by the joining of two complementary recesses in a respective interface surface of each sub-part.

It is especially advantageous for at least one injection head to be placed so as to allow a stopper fixing means to operate.

Again, according to one aspect, an upper part of the mould has at least two configurations, the injection head being integrated into said upper part, the injection head being capable of injecting the beverage into the preform in the first configuration, and the stopper fixing means being designed to position a stopper on the neck of a preform in the second configuration.

The invention also relates to an industrial process employing the device according to the invention. This process includes in particular a step of fitting a cap onto the container before the step of extracting the container from the mould.

It may also include a step of cleaning at least part of the mould before the step of inserting a preform into the mould.

According to one advantageous feature, the process includes a step of injecting the beverage into a thermoplastic preform, said injection being carried out through an injection head integrated into the mould.

Preferably, the process additionally includes a step of forming the container with air up to a fraction of its final volume, for example greater than 70%, followed by a step of increasing the pressure accomplished by using the beverage This is because air is not as capable as the beverage of cooling the thermoplastic undergoing expansion. This feature therefore has the advantage of providing a more stable process and an operating window of the enlarged process.

BRIEF DESCRIPTION OF THE DRAWINGS

The invention will now be described in detail, with reference to the appended figures, which relate to exemplary embodiments.

DETAILED DESCRIPTION OF THE INVENTION

The embodiment given here by way of example relates to a process for manufacturing PET mineral water bottles from a heated preform. The preform has the shape of a cylindrical tube closed at its lower end. The open head of the preform corresponds to the neck of the bottle, onto which a closure cap is screwed.

Figure 1:
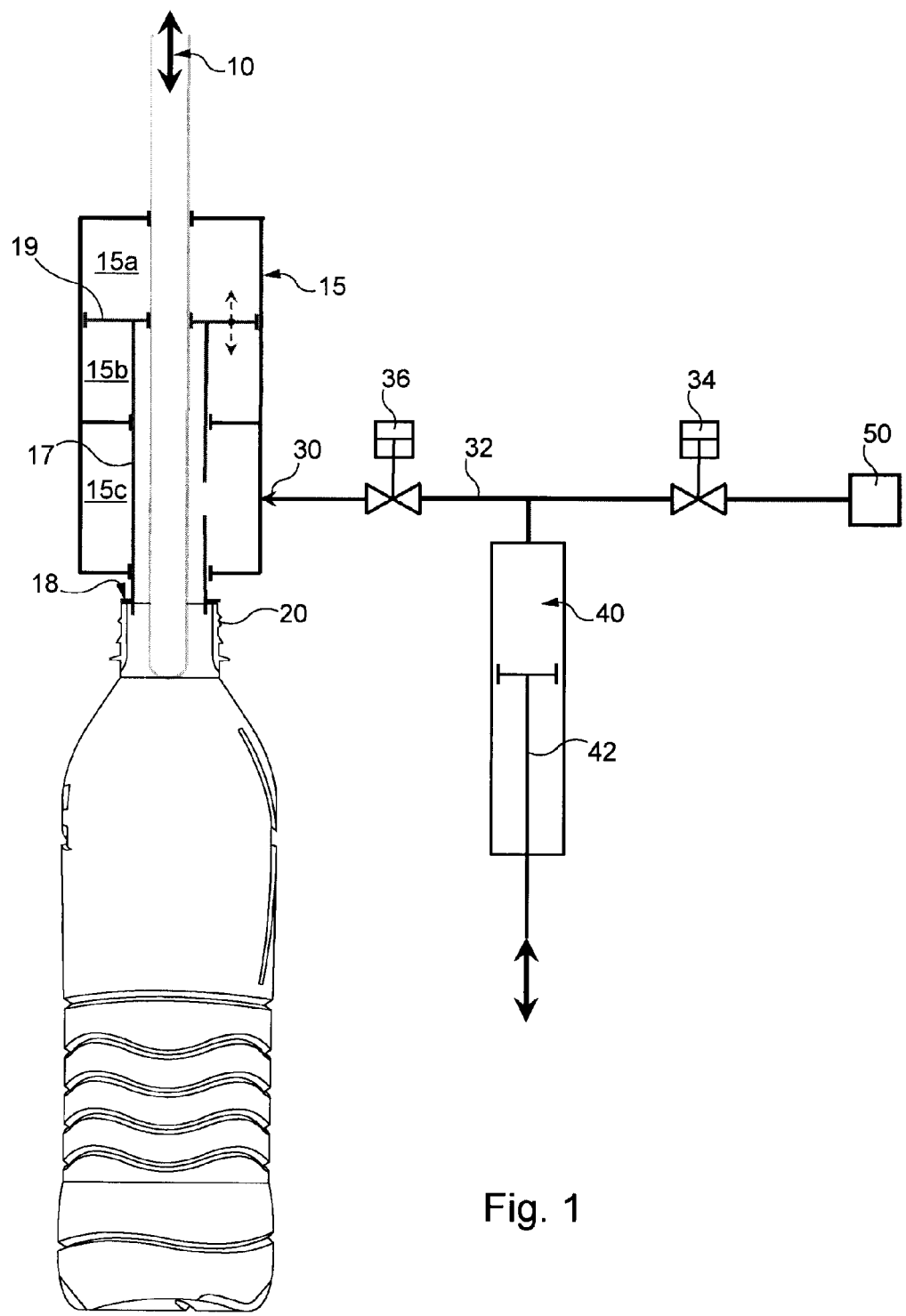
FIG. 1 shows a general diagram illustrating the principle of operating an installation employing the invention.

Referring to FIG. 1, a stretch rod 10 is inserted into a compressed-air actuator 15. The stretch rod 10 is controlled by a stretch motor, which gives it a longitudinal movement (represented by an arrow).

The stretch rod is pneumatically controlled (actuator and cam) or, either alternatively or in combination, electrically controlled. A control using an actuator is preferential and used in the preferred embodiment of the invention.

The compressed-air actuator 15 comprises a cylinder 17 controlling an injection head 18, through which the stretch rod 10 passes. The injection head 18 is connected to the neck 20 of a PET preform placed in a mould (not shown), which preform, after being expanded, takes on the shape of a mineral water bottle, this shape being determined by the wall of the mould.

The actuator comprises three chambers, the upper two chambers 15$a$ and 15$b$ being filled with compressed air. Between these upper two chambers, a piston wall 19 slides in a direction parallel to the stretch rod (the displacement being represented by an arrow). The stretch rod 10 passes through the centre of this wall 19.

The compressed-air actuator also includes a lateral inlet 30 for the beverage, here mineral water, connected to the third chamber 15$c$ of the actuator, this being the bottom chamber. The beverage is fed in via a line 32.

An external mineral water inlet feeds the liquid via the remote end of this line 32 into a first valve 34, which is connected to the opening of a single-chamber filling cylinder 40 comprising a piston 42 controlled by a filling motor (movement of which is represented by an arrow). This motor imparts a longitudinal movement on the piston in the single chamber of the filling cylinder 40.

Before passing through the first valve, the mineral water is deaerated beforehand by an upstream deaeration system 50 for controlling the air saturation of the mineral water.

On the line 32 there is a second valve 36, which is in series behind the first valve 34 and the opening of the filling cylinder 40. The line 32 then runs into the bottom chamber 15$c$ of the compressed-air actuator 15.

The bottom chamber 15$c$ of the compressed-air actuator is penetrated by the cylinder 17 for controlling the filling head 18, the internal volume of which emerges through the lower outlet of the compressed-air actuator 15 into the filling head 18. The control cylinder has a lateral opening allowing the beverage to circulate between the bottom chamber of the actuator and the inside of the control cylinder.

The stretch rod 10 itself passes through the control cylinder 17 as far as the filling head 18 and the neck 20 of the bottle preform.

Figure 2:
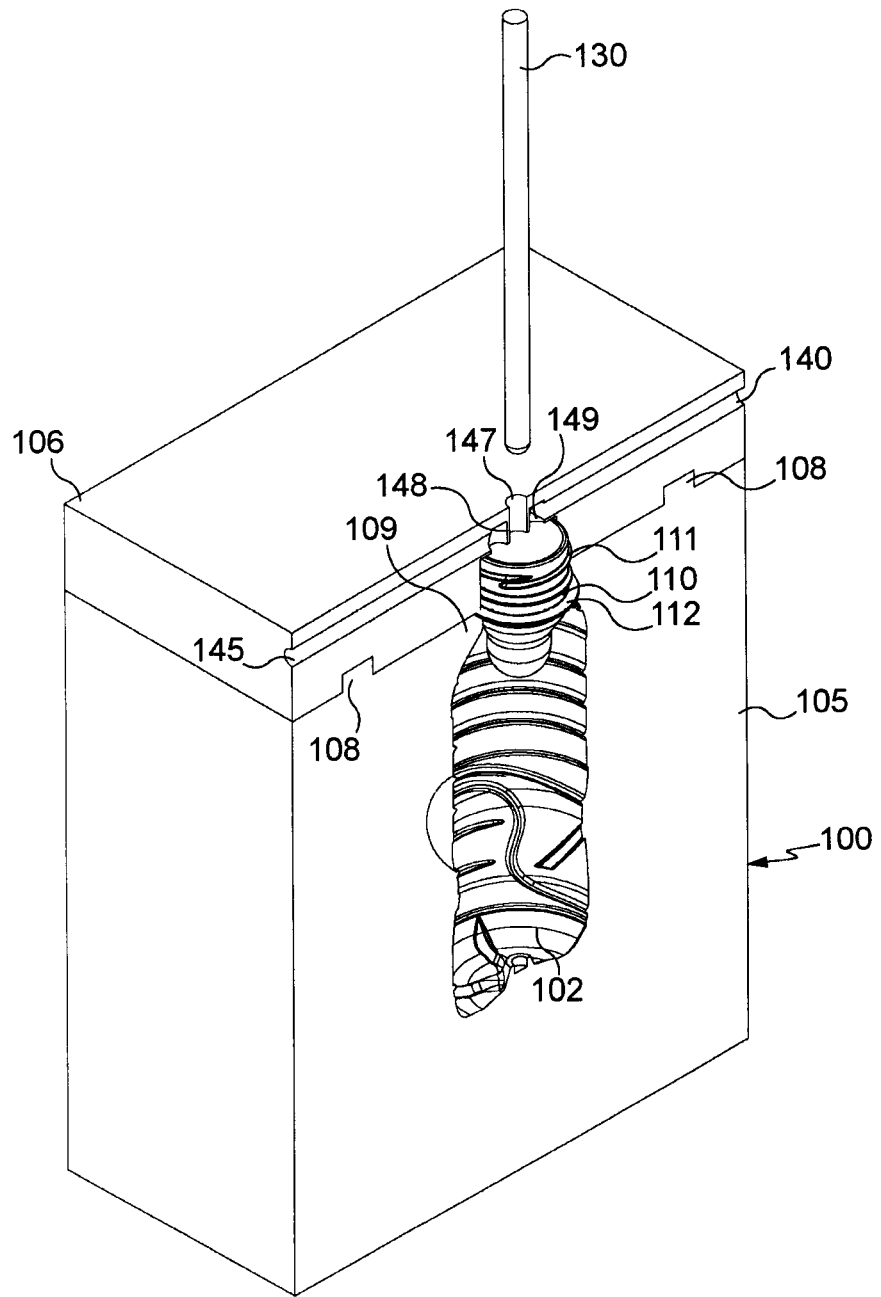
FIG. 2 shows a beverage delivery device according to the invention, shown in cross section and in perspective, a PET preform being placed in the mould and a stretch rod being placed in the high position.

FIG. 2 shows a half-mould 100, a PET preform 110 being positioned in the top part of the cavity of the half-mould, which has a cylindrical general shape, with a bottom 102 in the lower part. A second half-mould (not shown) completes the mould and immobilizes the preform in the closed cavity formed by the cavities of the two half-moulds, the closed cavity defining the beverage bottle shape.

It should be noted that the half-mould 100 comprises a bottom part 105 and a top part 106, the top part 106 being fixed to the bottom part via two rails 108 forming protuberances on the upper face of the top part 106, the two rails being parallel to each other, on either side of the cavity of the mould, perpendicular to the plane of section. The cavity of the mould is mainly contained in the bottom part of the mould.

The preform 110 includes an already formed neck 111, having an external screw thread for receiving a stopper. The neck 111 is positioned in a narrowing 109 of the cavity of the half-mould, designed to immobilize it, while still being complementary to the shape of the final bottle. It should be noted that this narrowing 109 is just below the upper face of the bottom part of the mould and that the neck is thus in contact both with the top part 106 of the mould and with its bottom part 105. The screw thread of the neck is in contact with the wall of a generally cylindrical cavity of the top part 106 of the mould. The neck also has a flange 112 positioned exactly at the interface between the top part 106 and the bottom part 105 of the mould.

In the extension of the neck, in the direction of the bottom 102 of the cavity, the preform has a recess (masked in the figure), terminating in a bottom.

The internal surface of the cavity of the mould is structured so as to define the external structure of a beverage bottle, here a mineral water bottle. This structure includes circular grooves, some of which have a structural or functional role such as for example to allow a user to grip the bottle or to provide flexibility during use, or for the purpose of removing the bottle after use.

The mould includes, in its top part, two straight ducts 140 and 145 of circular cross section, one along the extension of the other, perpendicular to the axis of the cavity of the mould, corresponding to the axis of the bottle once formed. The two ducts are placed on either side of the top of the neck of the preform and are open at the top of said neck in such a way that a liquid injected into one or other of these ducts runs into the neck of the preform. It should be noted that the two ducts are in the plane of section of the mould and are therefore formed by the joining of the half-mould shown with the complementary half-mould.

A stretch rod 130 is positioned in the upper part of the figure, along the extension of the preform axis and of the mould recess. A cylindrical opening 147 in the top part of the mould, having its axis aligned with the preform axis, enables the stretch rod 130 to be inserted into the mould and into the recess of the preform, up to the point where the end of the rod comes into contact with the bottom of the recess, in order to stretch the preform.

It should be noted that above the neck the mould has two spouts 148 and 149 at the outlet of the ducts 145 and 140, enabling the fluid injected via the respective ducts 145 and 140 to be oriented towards the inside of the preform through its neck, thus causing the fluid to turn through 90°. The two spouts 148 and 149 also separate the inside of the ducts from the inside of the cylindrical opening 147. Each of the two spouts 148 and 149 forms an "injection head" within the meaning of the present invention, and as can be seen in FIG. 2, each of the injection heads is integrated into the body of the mould halves 100.

During the method of using the device described, the temperature of the preform is brought beforehand to a value between 50° C. and 130° C., or even between 75° C. and 100° C. In the preferred embodiment, this value is 95° C., the plastic used being PET.

The rod has a speed of between 0.5 and 3.0 ms$^{-1}$, or even between 1.0 and 2.5 ms$^{-1}$. In the preferred embodiment, this value is 1.6 ms$^{-1}$.

The temperature of the beverage is brought beforehand to a value between 1° C. and 120° C., preferably between 10° C. and 90° C. In the preferred embodiment, this value is 30° C.

The longitudinal stretch ratio of the thermoplastic is between 2 and 5, or even between 2.5 and 4. In the preferred embodiment, this value is 3.5.

The radial stretch ratio of the thermoplastic is between 2 and 7, or even between 3 and 4.5. In the preferred embodiment, this value is 4.

The thermoplastic is chosen from the group consisting of polyethylene terephthalates, polypropylenes, polyethylenes, polycarbonates, polystyrenes, polylactic acids, polyvinyl chlorides and combinations thereof. In the preferred embodiment, it is PET.

The temperature of the mould is at least 50° C. below the melting point of the thermoplastic, which in the case of PET is 230° C. Preferably, this temperature is maintained below 100° C. In the preferred embodiment, the temperature of the mould is equal to the ambient temperature.

Figure 3:
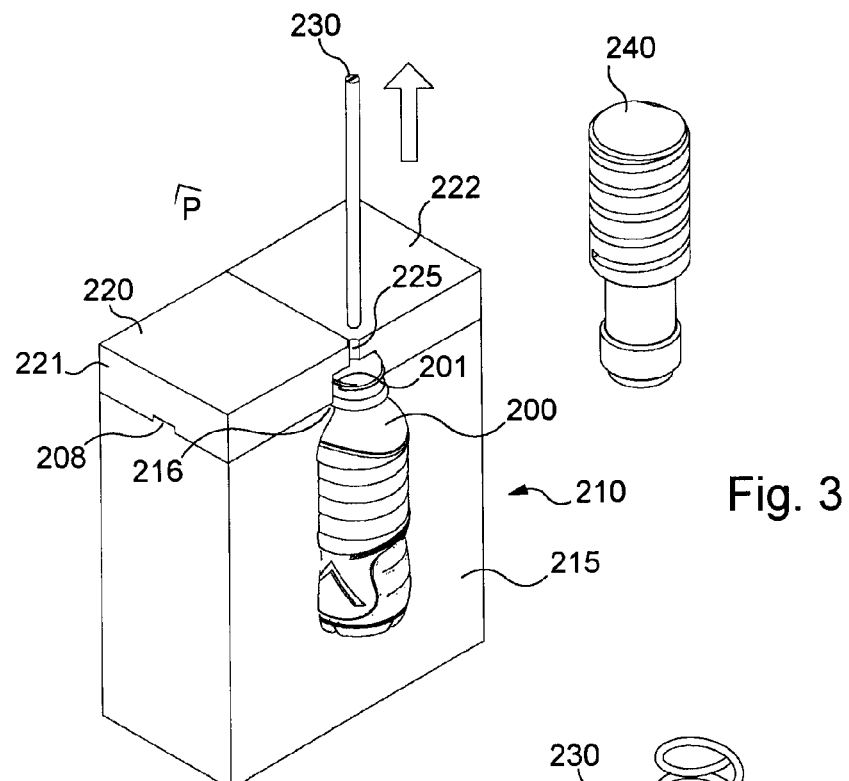
FIG. 3 shows another aspect of a beverage delivery device according to the invention, shown in cross section and in perspective, the stretch rod being placed in the high position.

Referring to FIG. 3, a bottle 200 filled with mineral water is present in the mould 210 (represented in cross section) after a phase of expanding the PET preform and filling the bottle. Compared with FIG. 2, the viewing angle is modified by 90°, a rail 208 corresponding to one of the rails 108 in FIG. 2 being recognized.

This representation of the mould shows that its upper part 220 is made up of two sub-parts 221 and 222 which are symmetrical with respect to each other relative to a plane of symmetry P passing through the axis of the stretch rod 230, the axis of the mould cavity and the axis of the bottle. The two sub-parts are also in contact with each other along the plane of symmetry, except above the neck 201 of the bottle, where an orifice 225 (corresponding to the opening 147 in FIG. 2) is provided so as to let the stretch rod pass.

As previously, the lower part 215 of the mould comprises a cavity in the form corresponding to that of a mineral water bottle, the neck 201 of the bottle running into the cavity of the lower part, through a narrowing 216 of the cavity corresponding to the rounding of the upper part of the bottle.

It should be noted that the neck 201 of the bottle is surrounded by the upper part 220 of the mould.

Also shown in FIG. 3 is the retraction movement (vertical arrow) of the stretch rod 230 after the expansion phase. Also shown is the approach of a stoppering device 240, which is positioned along the extension of the axis of the bottle, above the neck of the latter.

Figure 4:
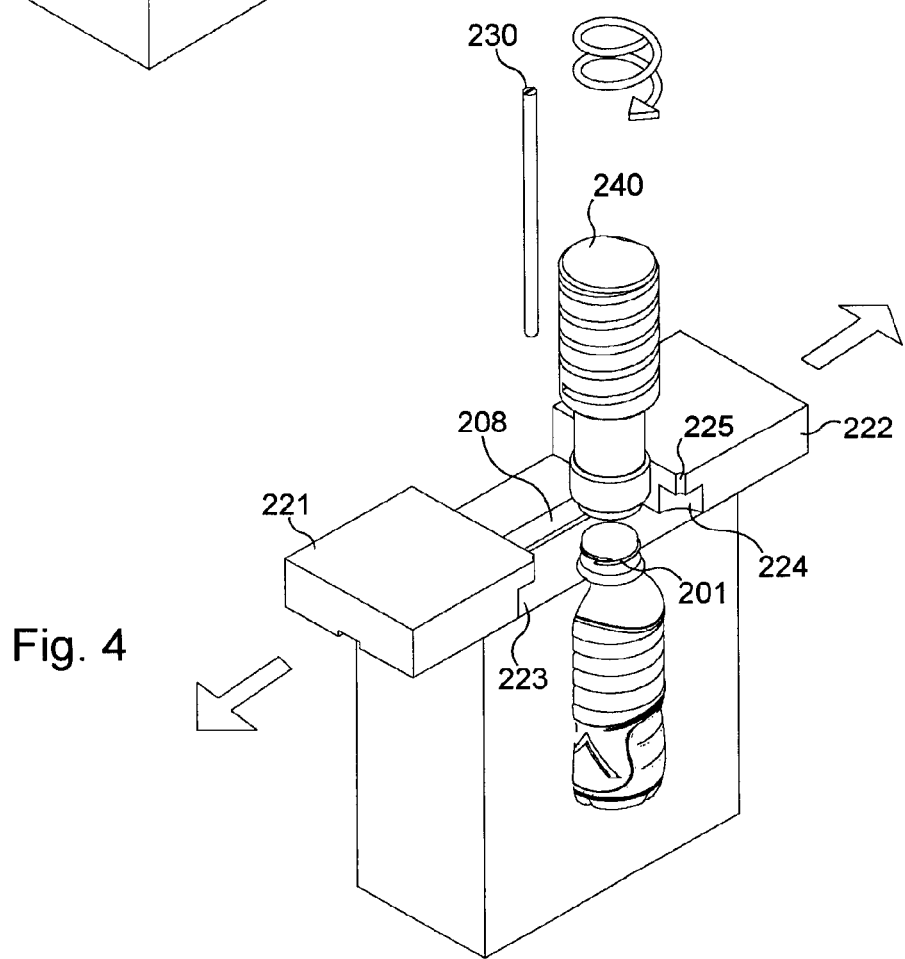
FIG. 4 shows the same aspect of a beverage delivery device, during a step of stoppering the bottle.

Referring to FIG. 4, the two sub-parts 221 and 222 of the upper part of the mould have been separated laterally (horizontal arrows) and leave access to the neck 201 of the bottle. The two sub-parts 223 and 224 of the cavity of the upper part of the mould are distinguished, in which the neck of the bottle was housed in the position shown in FIG. 3. It should be noted that this cavity is co-axial with the orifice 225, which extends it towards the outside of the mould. It should also be noted that the neck of the bottle has, on its cylindrical outer surface, a screw thread enabling a stopper to be fitted.

The movement of the two sub-parts is guided by the rail 208 on the upper face of the lower part of the mould. The stretch rod 230 is also positioned away from the vertical through the bottle.

The stoppering device is then positioned vertically above the neck of the bottle. It is then rotated (shown by a curved arrow) and fits a cap onto the neck of the bottle.

Of course, the invention is not limited to the embodiment described and illustrated by the appended drawings, rather it extends to all variants that can be envisaged by a person skilled in the art within the scope of the claims.

The invention claimed is:

1. Device for delivering a beverage into a thermoplastic container formed from a heated preform, the preform being positioned in a mold, the device comprising an injector for injecting at least one beverage into a recess in the preform so as to promote expansion of the preform inside the mold, the mold defining the shape of the container, the injector comprising at least one injection head designed to inject at least one component of the beverage through a mouth of the recess, the at least one injection head being integrated into the mold, and the at least one injection head including a spout on an end of a duct perpendicular to one axis of a cavity of the mold, the duct being connected to a circuit for supplying at least one constituent of the beverage, and the duct being integrated into a top part of the mold, the top part comprising two sub-parts and the duct being formed by the joining of two complementary recesses in a respective interface surface of each sub-part, and the device further comprising a member for fixing a stopper on a neck of the recess.

2. Device for delivering a beverage into a thermoplastic container that is formed from a heated preform positioned in a mold, the device comprising an injection head, integrated into the mold, for injecting at least one beverage into a recess in the preform to expand, the mold defining the shape of the container, the injection head injecting at least one component of the beverage through a mouth of the recess, and a stopper that can be positioned on a neck of the recess, the injection head includes a spout on an end of a duct perpendicular to one axis of a cavity of the mold, the duct being connected to a circuit for supplying at least one constituent of the beverage, the duct is integrated into a top part of the mold, the top part comprises two sub-parts and in that the duct is formed by the joining of two complementary recesses in a respective interface surface of each sub-part.

* * * * *